Figure 1:
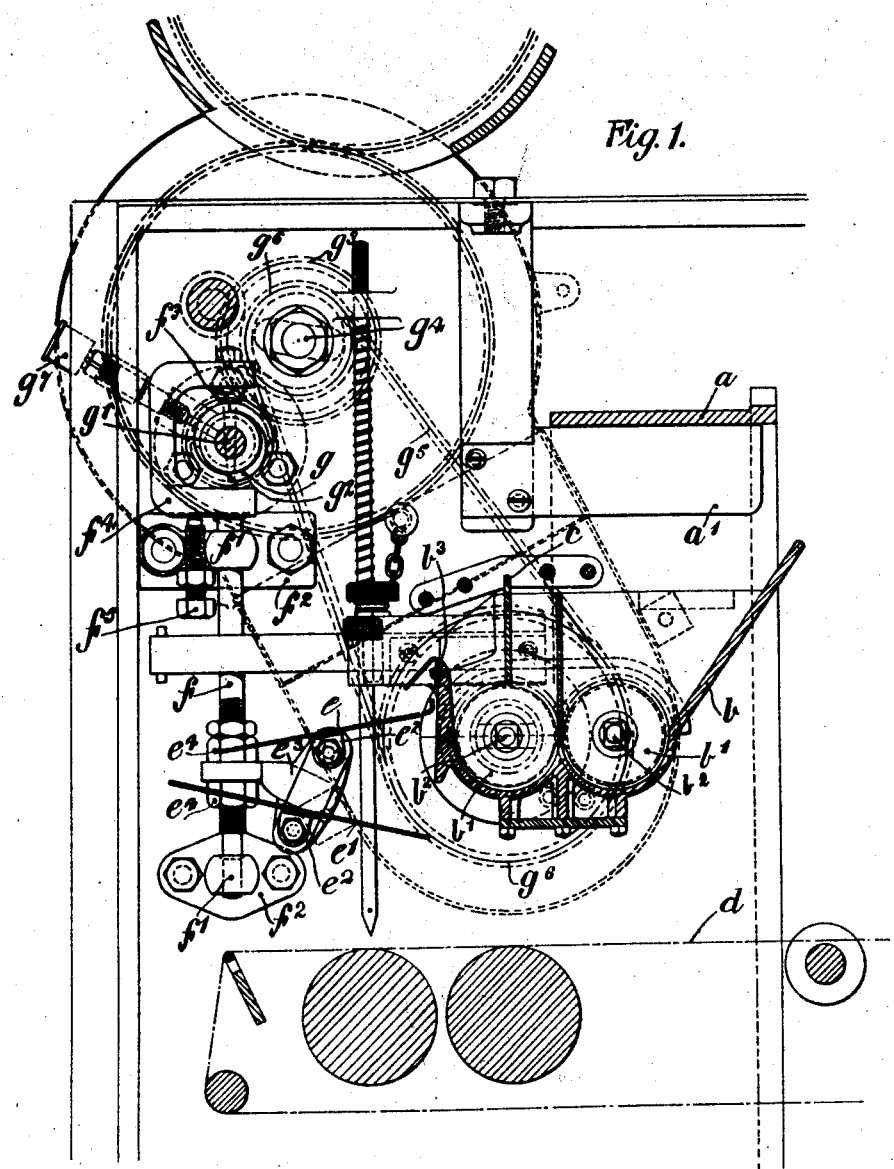

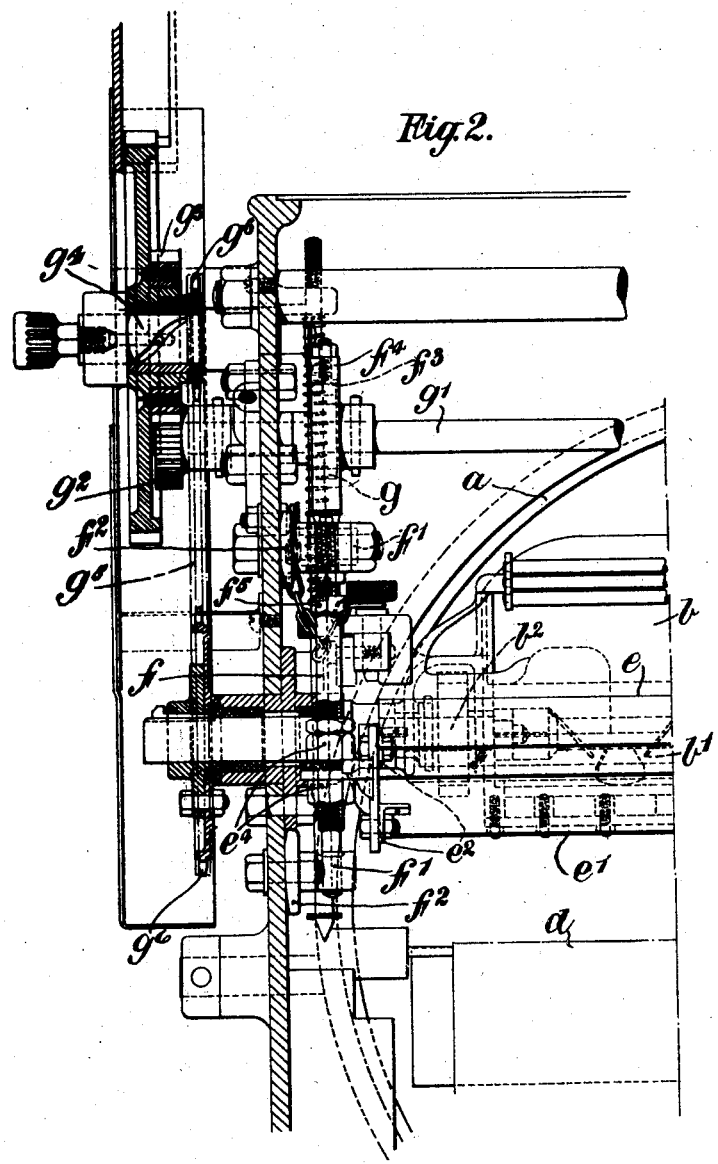

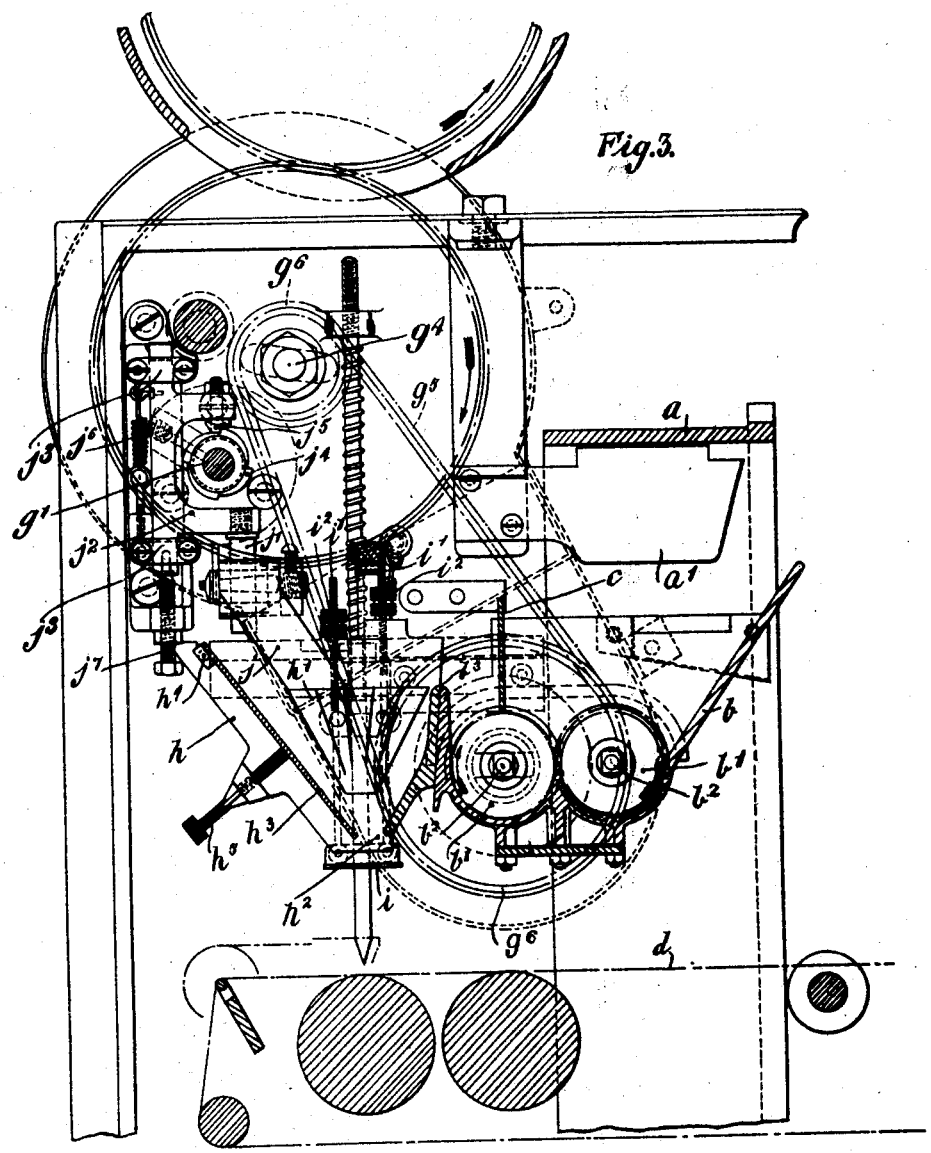

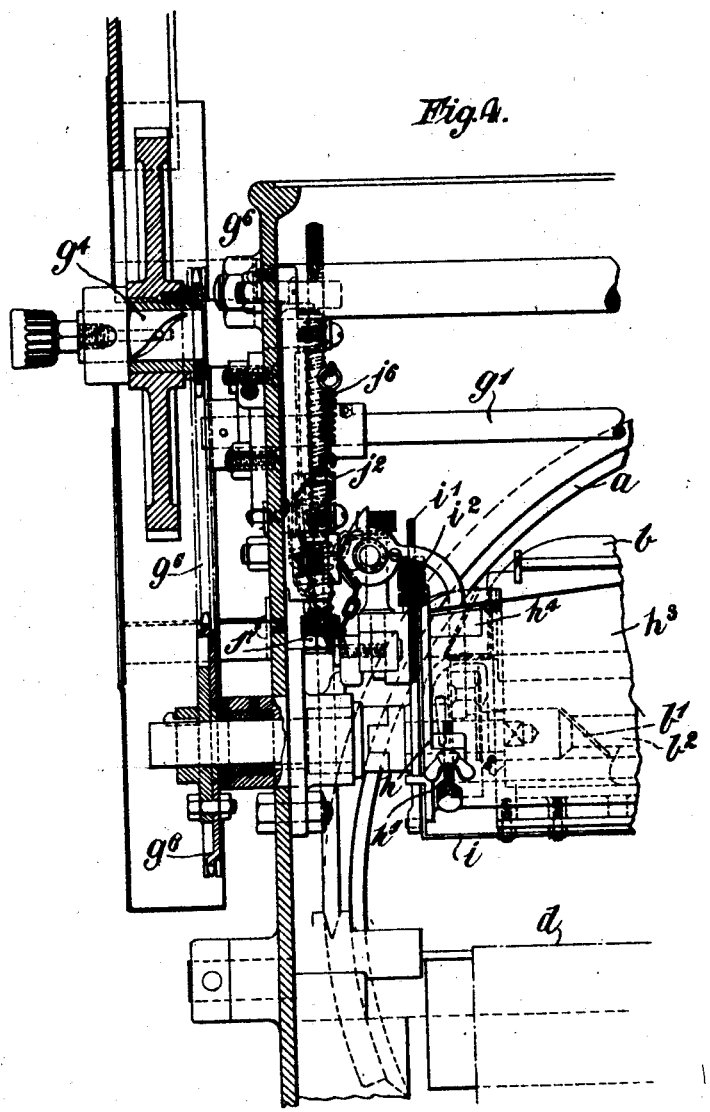

Patented July 20, 1926.

1,593,006

UNITED STATES PATENT OFFICE.

GEORGE RALPH BAKER AND RONALD HEAD, OF LONDON, ENGLAND, ASSIGNORS TO BAKER-PERKINS COMPANY INCORPORATED, OF WHITE PLAINS, NEW YORK, A CORPORATION OF NEW YORK.

APPARATUS FOR THE COATING OF CONFECTIONS.

Application filed September 23, 1924, Serial No. 739,304, and in England November 10, 1923.

This invention relates to apparatus for the coating of confections with chocolate or other more or less viscous substance in which the latter is elevated or pumped to a position above the goods or "centres" to be coated and flooded over same in a stream.

In such apparatus the coating substance tends to absorb and imprison air during its various movements with the result that the finished goods are frequently defaced with air blisters or bubbles which may break before the coating sets, in which case a rough mark or hole is produced; or again the blister or bubble may solidify and is then liable to break after the coating has set in handling or otherwise, thus detracting considerably from the value of the finished goods.

Various attempts have previously been made for reducing the imprisoned air in the coating substance to a minimum, but the present invention primarily provides positive means for expelling the air from the coating substance by agitating it immediately prior to flooding it over the goods or centres, such means ensuring considerable improvement in the quality of the finished articles.

Embodiments of the invention hereinafter described are particularly designed for use in conjunction with the apparatus described in the specifications of Letters Patent No. 1,350,538 and application No. 644,327, but may be used independently thereof, or together with other forms of coating apparatus for the purpose of deaerating the coating substance, more particularly during or immediately prior to the flooding operation.

The embodiments referred to are illustrated in the accompanying drawings and show the invention as applied to the apparatus of application No. 644,327 referred to.

In said drawings Fig. 1 is a sectional side elevation and Fig. 2 a partial sectional end elevation of one form of the apparatus and Figs. 3 and 4 are similar views of the second form.

In all said figures $a$ designates the rotating drum of the chocolate coating machine which elevates the chocolate from a tank (not shown) in the base, from the interior of which drum the chocolate is removed by means of a scraper $a^1$ extending into the drum and delivered into a mixing vessel $b$ containing two sets of mixing or stirring members shown in the form of beaters $b^1$ mounted on shafts $b^2$. Adjacent and above one of the mixing members is a baffle or deflecting member $c$ which causes the chocolate to take a circuitous path before it is discharged from the mixing vessel $b$ at the point $b^3$ to be ultimately delivered on to the goods which are carried through the machine on the conveyor $d$.

In the form of apparatus illustrated in Figs. 1 and 2 the coating substance is delivered from the mixing vessel $b$ onto an inclined vibratory or oscillating member $e$ down which it passes onto a second similar member $e^1$ inclined in the opposite direction. There may be as many of said vibratory members as required and they are shown in the form of plates provided with lugs $e^2$ attached to a common cross frame $e^3$ said frame being adjustably connected by nuts $e^4$ to a vertical spindle $f$. This spindle is mounted in bearings $f^1$ in suitable brackets $f^2$ and is given a rapid oscillating or vibrating motion by means of a ratchet toothed cam $g$ which acts upon a projection $f^3$ on the inside of a stirrup $f^4$ formed on the upper end of the spindle $f$. The cam is carried by a shaft $g^1$ suitably mounted in the side frames of the machine and rotated by any convenient means. In the form shown the shaft is provided with a pinion $g^2$ with which meshes a spur wheel $g^3$ on the main drive shaft $g^4$ of the machine, this shaft driving the mixing devices before referred to by means of chain and sprocket gear $g^5, g^6$. Suitable means such as a grease cup $g^7$ are provided for lubricating the cam shaft $g^1$. The extent of vibration of the stirrup may be varied by means of a screw $f^5$ forming an abutment therefor.

From the above description it will be seen that the coating substance moves down the vibratory member or members $e, e^1$ prior to its deposit on to the goods or centres. The said member or members is or are more or less violently vibrated and this action has the effect of driving out the air from the coating substance and at the same time the further effect of maintaining said substance in thoroughly mixed condition right up to the time it is flooded over the goods.

A further advantage of the use of the vibratory members is that they act to spread the coating substance into the form of a uniform curtain or sheet adapted to evenly coat the goods fed through the apparatus over its whole width.

A single vibratory member slightly inclined to the vertical may be used and provided with one or more abutments or obstacles over which the substance passes as the member is vibrated, or as in the form shown, two or more members slightly inclined to the horizontal may be employed and arranged so that the substance takes a zig-zag or circuitous course over and between them, and said members may if desired be provided with ribs or projections to further assist the de-aeration and spreading action referred to above.

The invention further contemplates imparting vibratory or oscillatory movements to the coating substance prior to its discharge from the flooding or mixing vessel or equivalent. For example in connection with the baffle or deflecting member $c$ such a baffle member or an equivalent thereof provided in the vessel is given rapid or energetic vibratory or oscillatory movements for example in a vertical direction, such an arrangement having been found to impart a preliminary de-aeration to the substance before its delivery to the vibratory members or plates previously described.

To now refer to the form illustrated in Figs. 3 and 4 the same general features of the coating machine as above described are disclosed and given the same reference characters.

In this form however the coating substance is delivered from the mixing vessel $b$ into a discharge or distributing vessel $h$ in which are located one or more vibrating surfaces $h^1$ down and over which the coating substance must pass before reaching a restricted outlet $h^2$ to be thereupon delivered on to the goods or centres. This vessel as shown is of conical form with the apex downwards and encloses a number of said vibrating surfaces arranged either annularly or as plane or flat plates all leading conically or in inclined manner towards the outlet $h^2$. The upper edges of the vibrating surfaces are preferably at or about the level at which the coating substance is fed thereto from the mixing vessel at $b^3$ and in the case of chocolate, owing to its viscosity, this arrangement will tend to keep the vessel substantially full and at about said level.

The extent of opening of the outlet $h^2$ may be regulated by pivoting one wall $h^3$ of the discharge vessel at or about the top as at $h^4$ and adjusting said wall about the pivot as by means of a screw, or the like $h^5$. There may also be provided a door or plate $i$ below the outlet orifice with a screw and nut adjusting means $i^1$ $i^2$ for adjusting the degree of opening and so controlling it that two outlets may be provided one at each side for discharging the contents in two streams which may be varied as to volume by tilting the plate to one side or the other by the said adjusting screws referred to.

Somewhat similar means for vibrating the plates $h^1$ as described with reference to Figs. 1 and 2 may be used. As shown the said surfaces are mounted on one or a pair of arms or levers $j$ extending upwards out of the open top of the discharge vessel $h$ and connected to an extension $j^1$ of a stirrup $j^2$ carried in bearings $j^3$ and enclosing a ratchet toothed cam $j^4$ which acts on a projection $j^5$ mounted inside the stirrup, the latter being under the action of a tension spring $j^6$. Adjustment of the stirrup to vary the degree of oscillation may be provided for by a screw $j^7$.

It will be seen that the coating substance is thus caused to move down and over the vibrating surfaces prior to its deposit on to the goods or centres. The said member or members being more or less violently vibrated has the effect of driving out the air from the coating substance and at the same time the further effect of maintaining said substance in thoroughly mixed condition right up to the time it is flooded over the goods.

What we claim as our invention and desire to secure by Letters Patent of the United States is:—

1. In apparatus for coating confections, the combination with a container for a coating substance of a distributing vessel adapted to receive the coating substance from said container, one or more inclined vibratory surfaces within said distributing vessel and down which the coating substance passes by gravity and means for imparting vibratory movements to said surface or surfaces to expel air from the coating substance in its passage thereover.

2. In apparatus for coating confections, the combination with a container for a coating substance, of a distributing vessel having a restricted outlet, adapted to receive the coating substance from said container, one or more inclined vibratory surfaces within said distributing vessel and down which the coating substance passes by gravity, means for imparting vibratory movements to said surface or surfaces to expel air from the coating substance in its passage thereover, and means for regulating the aforesaid outlet to the distributing vessel whereby the coating substance may be discharged in a plurality of streams.

3. In apparatus for coating confections, a distributing vessel for coating substance comprising a conical exterior wall having an outlet at its base a plurality of inclined surfaces within said vessel and means for imparting rapid vibratory movements to said inclined surfaces.

4. In apparatus for coating confections, a distributing vessel for coating substance comprising a conical exterior wall having an outlet at its base a plurality of inclined surfaces within said vessel, means for imparting rapid vibratory movements to said inclined surfaces, and means for regulating said outlet to provide a plurality of discharge apertures.

In witness whereof we have signed this specification.

GEORGE RALPH BAKER.
RONALD HEAD.